United States Patent
Yamada

(10) Patent No.: US 8,625,127 B2
(45) Date of Patent: Jan. 7, 2014

(54) IMAGE FORMING APPARATUS THAT OUTPUTS IMAGE DATA TO PLURAL DESTINATIONS

(75) Inventor: Akihiro Yamada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 870 days.

(21) Appl. No.: 12/369,084

(22) Filed: Feb. 11, 2009

(65) Prior Publication Data

US 2009/0207442 A1   Aug. 20, 2009

(30) Foreign Application Priority Data

Feb. 19, 2008   (JP) .................................. 2008-036997

(51) Int. Cl.
*G06F 3/12* (2006.01)
*G06K 9/34* (2006.01)
*G06K 9/72* (2006.01)

(52) U.S. Cl.
USPC .......... 358/1.15; 358/1.13; 382/176; 382/229

(58) Field of Classification Search
USPC .................... 358/1.15, 1.13; 382/176, 229
See application file for complete search history.

(56) References Cited

U.S. PATENT DOCUMENTS

| 2004/0036907 A1* | 2/2004 | Simpson et al. | 358/1.15 |
| 2006/0045084 A1* | 3/2006 | Matsuda et al. | 370/389 |
| 2006/0061812 A1* | 3/2006 | Eda | 358/1.15 |
| 2008/0273221 A1* | 11/2008 | Couchman et al. | 358/1.15 |

FOREIGN PATENT DOCUMENTS

| JP | 05-308503 | 11/1993 |
| JP | 07-273922 | 10/1995 |
| JP | 08-237420 | 9/1996 |
| JP | 10-013592 | 1/1998 |
| JP | 2002-111936 | 4/2002 |
| JP | 2004-274499 | 9/2004 |

OTHER PUBLICATIONS

Office Action received in JP Application No. 2008-036997 mailed Feb. 16, 2010.

* cited by examiner

*Primary Examiner* — Fred Guillermety
(74) *Attorney, Agent, or Firm* — Banner & Witcoff, Ltd.

(57) ABSTRACT

An image forming apparatus includes a receiving unit that receives image data; an extracting unit that extracts specific information from the image data; a first recognizing unit that recognizes destination information from the specific information; and a control unit that outputs the image data, wherein, when the first recognition unit recognizes a plurality of destination information, the control unit outputs the image data to respective destinations corresponding to each of the plurality of the destination information.

15 Claims, 6 Drawing Sheets

FIG. 4

TARO YAMADA / HANAKO SUZUKI / SABURO KAWADA / SHIRO INOUE ← 101

| SENDER NAME | COMPANY NAME | ADDRESS | Tel | FAX | E-mail | SPECIAL DATA | OUTPUT MODE | REMARKS |
|---|---|---|---|---|---|---|---|---|
| JIRO SUZUKI | | | □□□-●●●-◇◇◇◇ | | cccddd@●●●●●●●●● | | STORAGE MODE | STORAGE UNIT 5 |
| | | | | | | | TRANSFER MODE | PRINTER 17 |
| | ○× TEMPORARY STAFFING AGENCY | | | ×××-△△△-○○○○ | | "CONFIDENTIAL" | MAIL TRANSFER MODE | abc@○○○.○○.○○ xyz@△△△.△△.△△ |
| | | | | | | | UNNECESSARY | |
| | | | | | | "TELEPHONE NUMBER" | PRINT MODE | STORAGE UNIT 5 HOST COMPUTER 15 |
| | | | | | | "○○PROJECT" | STORAGE MODE | |
| ICHIRO HAYASHI | | ××CHO □□CITY ○○ PREFECTURE | ▲▲▲-×××-●●●● | | | | PRINT MODE | |
| | | | | | | | MAIL TRANSFER MODE | efg@◇◇◇◇.◇◇.◇◇ |
| | | | | | | CONFIDENTIAL | STORAGE MODE | HOST COMPUTER 15 |

IMAGE FORMING APPARATUS THAT OUTPUTS IMAGE DATA TO PLURAL DESTINATIONS

CROSS-REFERENCE TO RELATED APPLICATIONS

This application claims priority from Japanese Patent Application No. 2008-036997 filed on Feb. 19, 2008, the entire subject matter of which is incorporated herein by reference.

TECHNICAL FIELD

This invention relates to an image forming apparatus that outputs image data that has reached a plurality of destinations.

BACKGROUND

Heretofore, in a facsimile data processing apparatus used by a plurality of users, a user who has received a facsimile manuscript is required to print or display the image data of the facsimile manuscript and to confirm its destination in order to distribute copies of the received facsimile manuscript to each destination.

For example, JP-A-08-237420 discloses a related technique for reading data concerning a recipient for whom the data has been destined by use of a recipient area extracting means and a recipient recognizing means, then sorting received image data, and imparting facsimile reception to the recipient through the telephone or the e-mail.

SUMMARY

Illustrative aspects of the invention provide an image forming apparatus that is capable of outputting image data, which is sent to a plurality of destinations, to each destination in accordance with a proper output method.

BRIEF DESCRIPTION OF THE DRAWINGS

Illustrative aspects of the invention will be described in detail with reference to the following figures wherein:

FIG. 4 is an explanatory drawing showing a setting table;

DETAILED DESCRIPTION

General Overview

Figure 1:
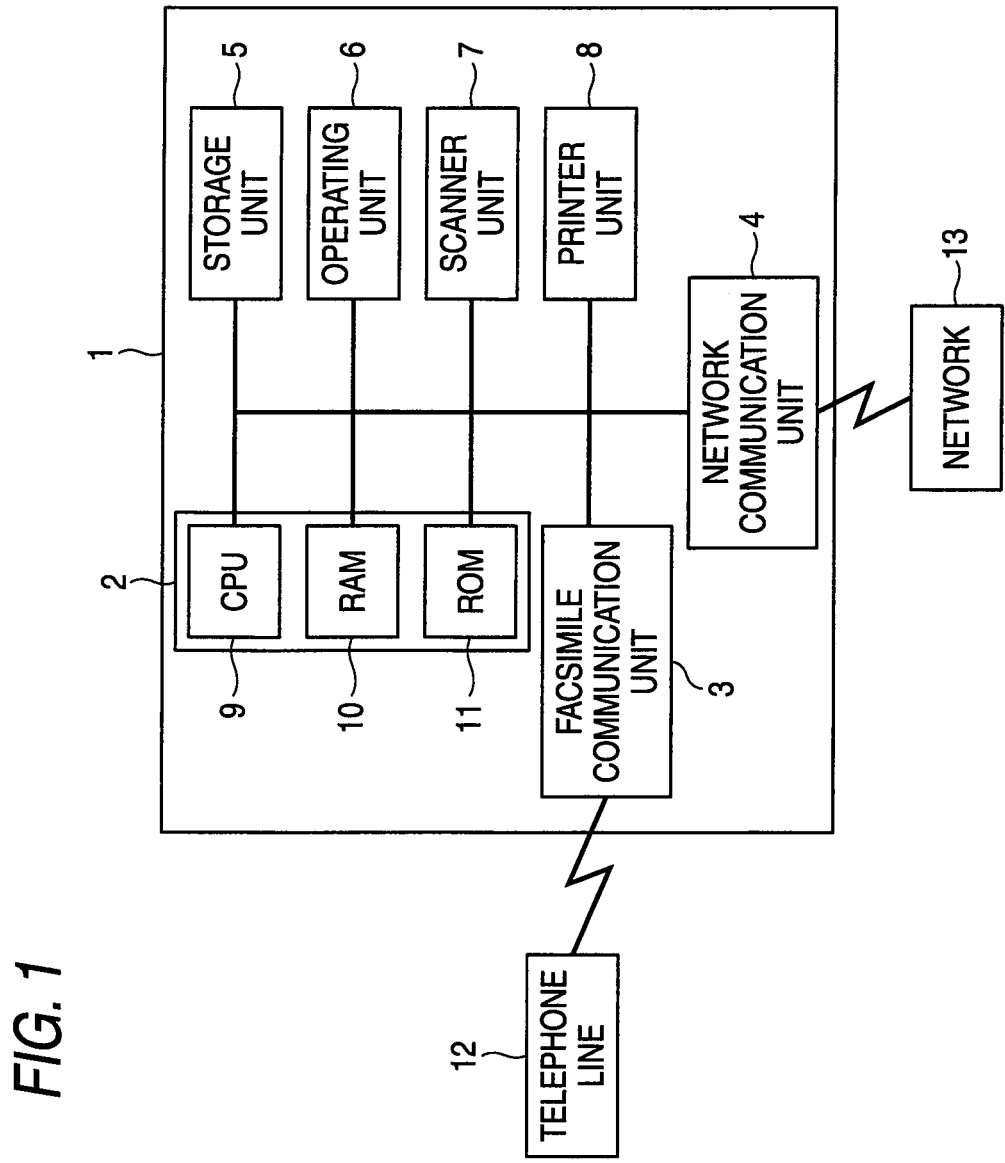
FIG. 1 is a functional block diagram showing an image forming apparatus according to an exemplary embodiment of the invention.

The related technique as described above has some disadvantages. For example, the related technique does not assume the image data as being sent to a plurality of destinations although no problem occurs if the number of destinations to which the received image data is sent is one.

Therefore, illustrative aspects of the invention provide an image forming apparatus that is capable of outputting image data, which is sent to a plurality of destinations, to each destination in accordance with a proper output method.

According to a first aspect of the invention, there is provided an image forming apparatus comprising: a receiving unit that receives image data; an extracting unit that extracts specific information from the image data; a first recognizing unit that recognizes destination information from the specific information; and a control unit that outputs the image data, wherein, when the first recognition unit recognizes a plurality of destination information, the control unit outputs the image data to respective destinations corresponding to each of the plurality of the destination information.

According to a second aspect of the invention, the image forming apparatus further comprises: a second recognizing unit that recognizes importance information from the specific information; and a setting unit that correlates the destination information with the importance information and sets an output location of the image data, wherein the control unit outputs the image data to the output location set by the setting unit.

According to a third aspect of the invention, in the image forming apparatus, the importance information comprises at least one of transmission source information and special information.

According to a fourth aspect of the invention, in the image forming apparatus, the specific information comprises confidential information.

According to a fifth aspect of the invention, in the image forming apparatus, the confidential information comprises a character string or a sign to keep secrecy or privacy of the image data.

According to a sixth aspect of the invention, in the image forming apparatus, the setting unit sets an output mode for outputting the image data.

According to a seventh aspect of the invention, in the image forming apparatus, the setting unit sets a plurality of output modes for one destination information.

According to an eighth aspect of the invention, the image forming apparatus further comprises a storage unit, wherein the output mode comprises a storage mode that stores the image data in the storage unit.

According to a ninth aspect of the invention, the image forming apparatus further comprises a printer unit, wherein the output mode comprises a print mode that prints the image data by the printer unit.

According to a tenth aspect of the invention, in the image forming apparatus, wherein the specific information comprises multiple languages.

According to an eleventh aspect of the invention, there is provided a facsimile receiving system comprising: a facsimile machine; an image forming apparatus that is connected to the facsimile machine via a telephone line, the image forming apparatus comprising: a receiving unit that receives image data sent from the facsimile machine via the telephone line; an extracting unit that extracts specific information from the image data; a first recognizing unit that recognizes destination information from the specific information; and a control unit that outputs the image data, wherein, when the first recognition unit recognizes a plurality of destination information, the control unit outputs the image data to respective destinations corresponding to each of the plurality of the destination information.

According to a twelfth aspect of the invention, the facsimile receiving system further comprises: a computer that is connected to the image forming apparatus via a network; and a printer that is connected to the image forming apparatus via the network, wherein the image forming apparatus further comprises: a second recognizing unit that recognizes importance information from the specific information; and a setting unit that correlates the destination information with the importance information and sets an output location of the image data, wherein the control unit outputs the image data to the output location set by the setting unit, and wherein the output location comprises at least one of the image forming apparatus, the computer and the printer.

According to a thirteenth aspect of the invention, in the facsimile receiving system, the setting unit sets an output mode for outputting the image data.

According to a fourteenth aspect of the invention, in the facsimile receiving system, wherein the computer comprises a host computer, and wherein the output mode comprises a storage mode that stores the image data in the host computer.

According to a fifteenth aspect of the invention, in the facsimile receiving system, wherein the image forming apparatus further comprises a printer unit, and wherein the output mode comprises a print mode that prints the image data by the printer unit.

According to a sixteenth aspect of the invention, in the facsimile receiving system, wherein the computer comprises a mail server and a terminal device, and wherein the output mode comprises a mail transmission mode that sent a mail including contents of the image data to the mail server in order to allow the terminal device to access the mail server to receive the mail.

According to a seventeenth aspect of the invention, in the facsimile receiving system, the output mode comprises a transfer mode that transfers the image data to the printer.

According to an eighteenth aspect of the invention, there is provided a method for outputting an image data, the method comprising: receiving an image data from a facsimile machine; extracting specific information from the image data; recognizing destination information from the specific information; and outputting the image data, wherein, when a plurality of destination information are recognized, the image data is output to respective destinations corresponding to each of the plurality of the destination information.

According to a nineteenth aspect of the invention, the method for outputting an image data further comprises: recognizing importance information from the specific information; and correlating the destination information with the importance information and setting an output location of the image data, wherein the image data is output to the output location.

According to the aspects of the invention, the image forming apparatus can output image data in accordance with each destination even if the image data is sent to a plurality of destinations.

According to the second and third aspects of the invention, the image forming apparatus can change an output method in accordance with importance information.

According to the fourth aspect of the invention, the image forming apparatus allows a user to freely register special information.

According to the sixth and seventh aspects of the invention, the image forming apparatus can perform an output operation for a single destination in accordance with a plurality of output methods.

Exemplary Embodiments

Exemplary embodiments of the invention will be described with reference to the drawings.

(Image Forming Apparatus)

The image forming apparatus 1 according to an exemplary embodiment of the invention will be described with reference to FIG. 1.

The image forming apparatus 1 is a multifunction device that functions as a copier, a facsimile and a printer. The image forming apparatus 1 includes a control unit 2, a facsimile communication unit 3, a network communication unit 4, a storage unit 5, an operating unit 6, a scanner unit 7 and a printer unit 8. The control unit 2 controls the image forming apparatus 1. The facsimile communication unit 3, the network communication unit 4, the storage unit 5, the operating unit 6, the scanner unit 7 and the printer unit 8 are respectively connected to the control unit 2.

The control unit 2 includes a CPU 9, a RAM 10 and a ROM 11. The CPU 9 controls the image forming apparatus 1 to function as the copier, the facsimile and the printer by executing a program stored in the ROM 11 in the area of the RAM 10. The CPU 9 is one example of a first recognizing unit of the invention, a control unit of the invention, a second recognizing unit of the invention, and a setting unit of the invention.

The facsimile communication unit 3 (one example of a receiving unit) is an interface by which the image forming apparatus 1 and a telephone line 12 are connected together. The control unit 2 executes the program so as to achieve facsimile transmission and facsimile reception. According thereto, a communication unit is formed.

The network communication unit 4 is an interface by which the image forming apparatus 1 and a network 13, such as a local area network (LAN) or the Internet, are connected together. The program is executed by the control unit 2 so as to achieve a network communication unit.

The storage unit 5 stores manuscript data 100 (which will be described later). The storage unit includes, for example, a hard disk serving as a mass storage.

The operating unit 6 has a display unit. For example, the operating unit 6 includes a liquid crystal display (not shown) serving as the display unit, a touch panel (not shown) serving as an operating unit provided on the liquid crystal display, and a keyboard (not shown) such as a numeric keypad. The operating unit 6 is controlled by the control unit 2 to receive an operation of a user. The operating unit 6 displays, for example, words and phrases, processing results, pieces of information input by the user, various key exhibitions, etc.

The scanner unit 7 (one example of an extracting unit) includes a CCD image pickup device and other scanner elements. The CCD image pickup device optically reads a manuscript and converts the manuscript into electric signals. The scanner unit 7 generates manuscript data 100 (one example of image data) from the electric signals. A character recognition part of the scanner unit 7 recognizes characters and the like of the manuscript data 100. Likewise, when the manuscript data 100 is received via the facsimile communication unit 3, the character recognition part of the scanner unit 7 recognizes characters and the like of the manuscript data 100. In other words, whenever the manuscript data 100 is present, the character recognition part of the scanner unit 7 can recognize characters and the like even if the manuscript is not optically read.

The printer unit 8 includes a semiconductor laser that forms an electrostatic latent image on a photosensitive drum, a transferring device that transfers toner adhering to the electrostatic latent image formed on the photosensitive drum to a sheet of paper, a fixing device that fixes the toner, and a sheet feeding/conveying device. The printer unit 8 may adopt an inkjet method for printing by use of ink or a thermal method for thermal printing by use of heat-sensitive sheets of paper.

(Manuscript Data)

Figure 2:
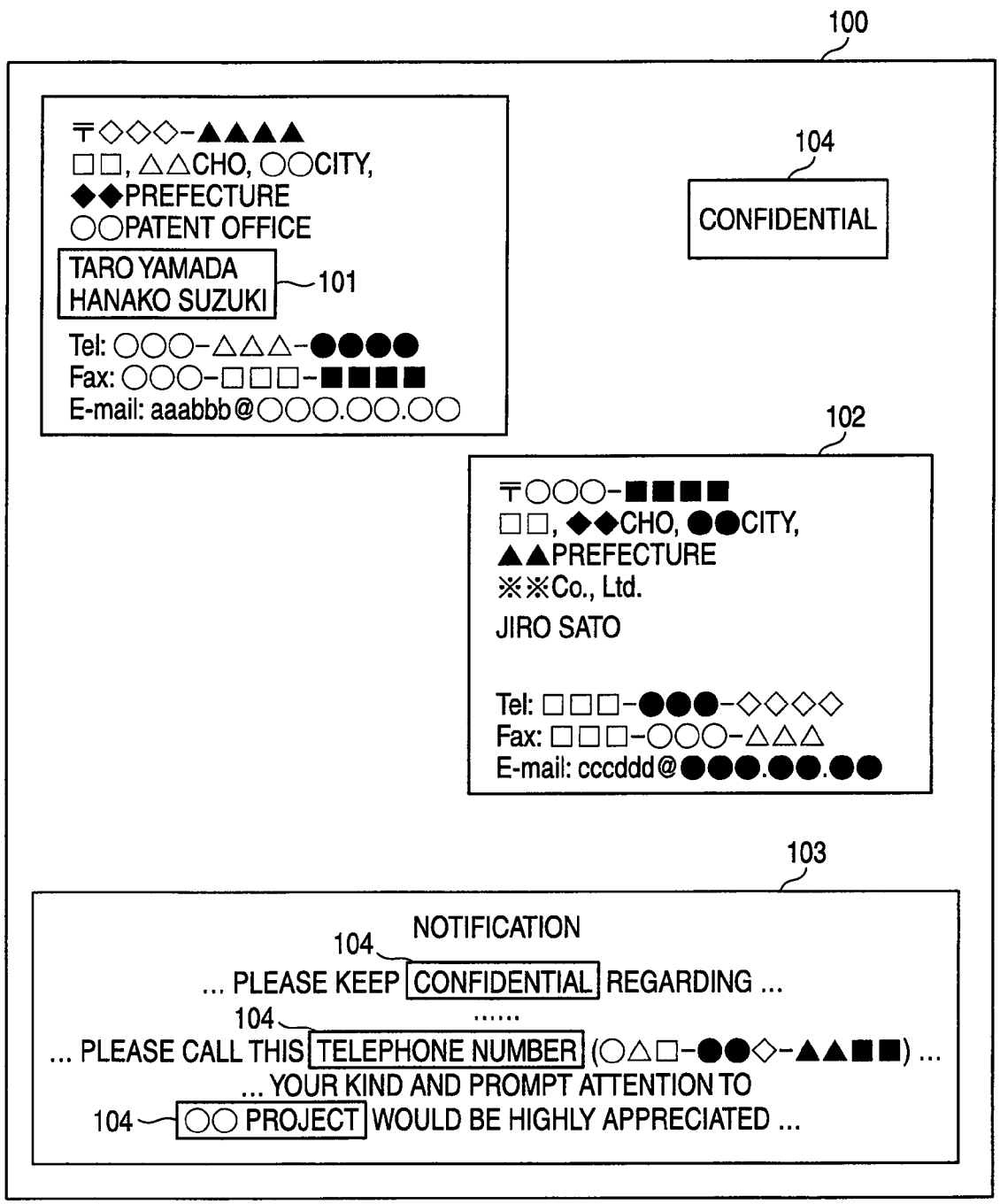
FIG. 2 is a schematic diagram of a manuscript data.

Referring to FIG. 2, the manuscript data 100 includes specific information such as destination data 101, transmission source data 102 and content data 103. Incidentally, the destination data 101 is one example of destination information, and the transmission source data 102 is one example of transmission source information.

The destination data 101 is information concerning a recipient by whom a facsimile is received. For example, the destination data 101 is information concerning the name of a recipient.

The transmission source data 102 is information concerning a sender from whom a facsimile is sent. The transmission source data 102 includes a sender's name, a company name, an address, a telephone number, a fax number, and an e-mail address.

The content data 103 includes data concerning contents to be given by a sender to a recipient.

In the manuscript data 100, special data 104 (one example of special information) is retrieved. Further, the special data 104 is one example of the specific information.

The special data 104 denotes character strings or signs that are freely set by a user.

The special data 104 of FIG. 2 shows an enclosed character (i.e., a sign formed by enclosing the character "confidential") and character strings of a "confidential," a "telephone number," and a "OO project."

These character strings or signs included in the special data 104 are data (one example of confidential information) keeping the secrecy or privacy of the manuscript data 100. The secrecy or privacy of the manuscript data 100 is protected by allowing a user to freely set these special data 104.

The transmission source data 102 and the special data 104 are example of importance information.

Characters of the manuscript data 100 are recognized by the character recognition part of the scanner unit 7. The transmission source data 102 and the special data 104 are stored in the storage unit 5 in the form of a setting table 19 (described later) while a user correlates these data with an output mode (described later). As a result, a predetermined output operation is performed in accordance with the transmission source data 102 and the special data 104 included in the manuscript data 100.

As shown in FIG. 4, the setting table 19 may make setting for each destination data 101.

To identify the name of the destination data 101 and the name of the transmission source data 102, reference is made to names registered in the setting table 19. At least, the name of a user who uses the image forming apparatus 1 is registered in the destination data 101. Therefore, a user's name can be prevented from being recognized as the transmission source data 102.

(Facsimile Receiving System)

Figure 3:
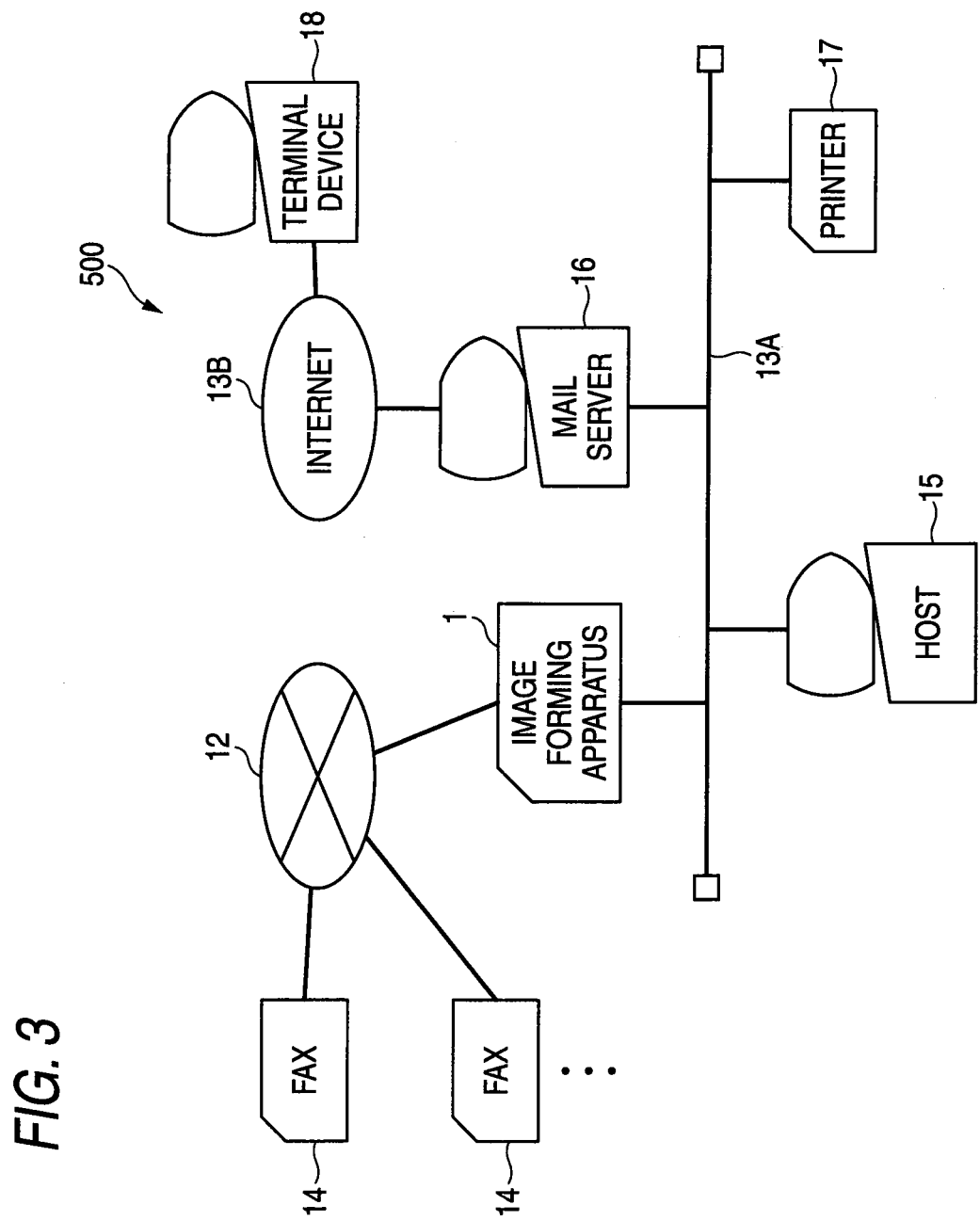
FIG. 3 is a diagram showing a facsimile receiving system.

Referring to FIG. 3, a facsimile receiving system 500 of the invention will be described.

For example, a plurality of facsimile machines 14 are connected to the telephone line 12. The image forming apparatus 1 is also connected to the telephone line 12. Accordingly, a facsimile can be sent and received between the image forming apparatus 1 and the facsimile machine 14 via the telephone line 12.

When the image forming apparatus 1 receives a facsimile sent from the facsimile machine 14 as a sender via the facsimile communication unit 3, the control unit 2 converts a manuscript data 100 of the facsimile into a predetermined format in order to print the manuscript data 100 by using the printer unit 8.

The image forming apparatus 1 is connected to a LAN 13A of a network 13. A host computer 15, a mail server 16, a printer 17, etc., are connected to the LAN 13A.

The host computer 15 includes a control unit and a storage unit (i.e., a hard disk). The host computer 15 may function as an external mass memory that stores image data obtained by the image forming apparatus 1.

The mail server 16 is connected to the Internet 13B of the network 13. An e-mail is sent and received between, for example, the image forming apparatus 1 and a terminal device 18 via the LAN 13A and the Internet 13B.

The printer 17 is connected to the LAN 13A of the network 13. The printer 17 prints image data transferred from the image forming apparatus 1 via the LAN 13A.

Incidentally, the image forming apparatus 1 may be directly connected to the Internet 13B.

The image forming apparatus 1 built into the facsimile receiving system 500 shown in FIG. 3 has a plurality of modes, each of which is used as an output mode executed when a facsimile is received. For example, the image forming apparatus 1 includes a general print mode function where the manuscript data 100 is output in the state of having been printed on a sheet of paper. In addition, the image forming apparatus 1 includes a storage mode where the received manuscript data 100 is stored in the storage unit 5 or the host computer 15, a mail transmission mode where the received manuscript data 100 is sent to, for example, other terminal devices 18 by use of an e-mail, and a transfer mode where the received manuscript data 100 is transferred to, for example, the printer 17 by use of the network 13.

Setting information for executing each of the output modes is set by a user through the operating unit 6. The setting information is stored on, for example, a hard disk of the storage unit 5, for each destination data 101 in the form of the setting table 19 (which will be described later), in which the transmission source data 102 or the special data 104 is correlated with various setting information such as the output mode.

Incidentally, the setting information may be set by using the host computer 15 connected through the LAN 13A or a management terminal (not shown).

(Setting Table)

As shown in FIG. 4, the setting table 19 is data stored by correlating the transmission source data 102 or the special data 104 and information necessary to execute the output mode with each other for the destination data 101. The setting table 19 can be set for each destination data 101. The user can input and select necessary items of the setting table 19 by use of the operation unit 6 to arrange setting information. The setting table 19 is stored in the storage unit in the form of a table.

Incidentally, the transmission source data 102 of the setting table 19 may not be required to set all items. In other words, at least one item of the transmission source data 102 is required to set. A transmission source can be specified if any one of the items of the transmission source data 102 is input. Any language can be input for the transmission source data 102 and can be used for the destination data 101. Further, multiple languages can coexist in the setting table 19.

Additionally, a setting operation can be performed such that a plurality of output modes is correlated with the single piece of transmission source data 102 or special data 104. According thereto, it is possible to output a single manuscript in a plurality of output modes.

Further, a plurality of output locations can be set for one output mode. For example, a plurality of printers 17 may be set as output locations of the transfer mode, and a plurality of mail addresses may be set as output locations of the mail transmission mode.

(Setting Table)

Figure 5:
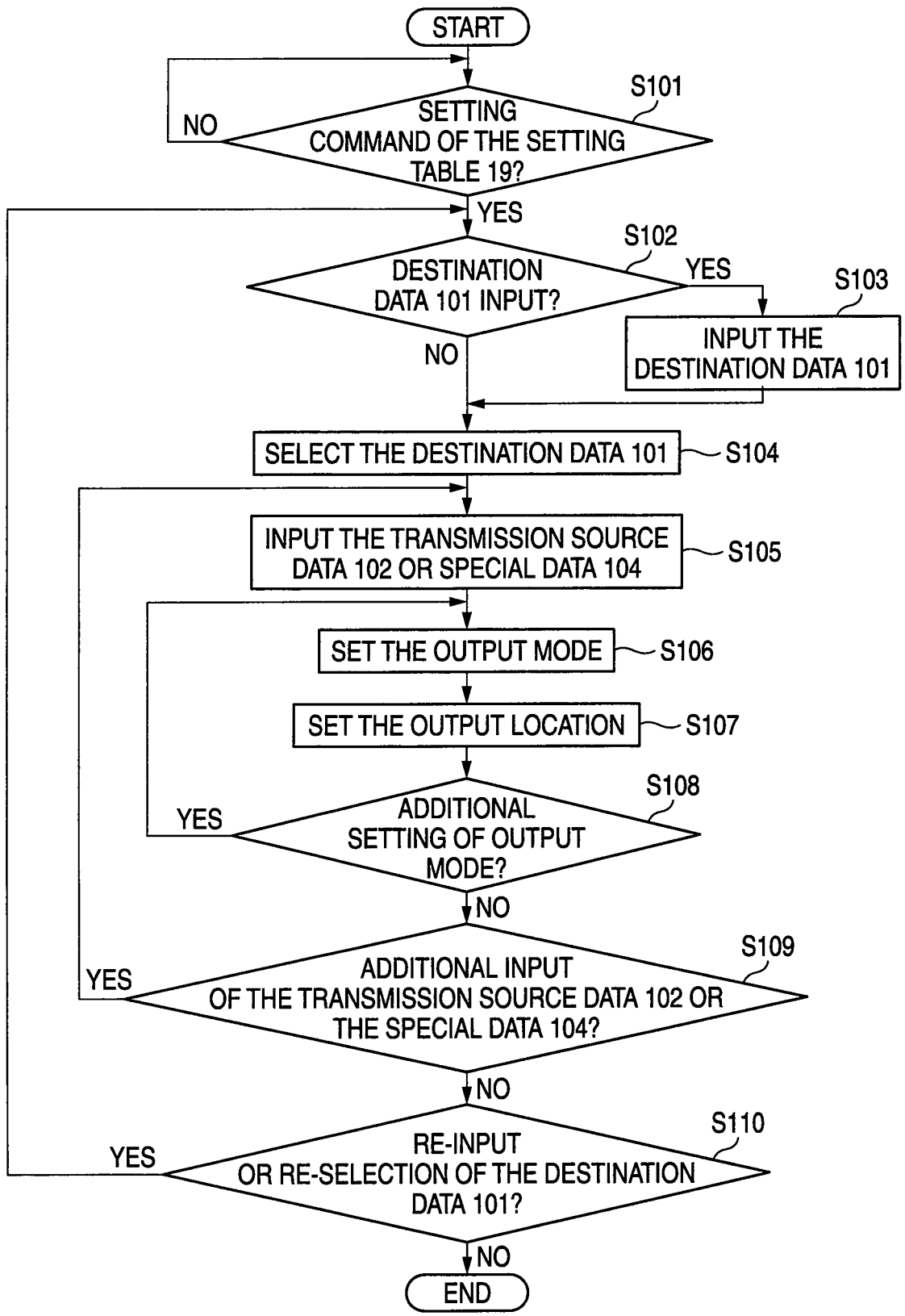
FIG. 5 is a flow chart showing a setting method for a setting table.

Referring to FIG. 5, method for setting the setting table 19 will be described.

When a user operates the operating unit 6, and a setting command of the setting table 19 is recognized at step 101 (hereinafter, referred to simply as "S101") (S101: Yes), it is determined whether the destination data 101 to be set is input at S102. If it is determined that the destination data 101 is required to be input (S102: Yes), the destination data 101 is input and is stored in the storage unit 5 at S103. After the input of the destination data 101 is completed at S103, the destination data 101 to be set is selected at S104.

In contrast, if it is determined that the destination data 101 is not required to be input at S102 (S102: No), S103 is skipped, and the destination data 101 to be set is selected at S104.

Then, the transmission data 102 or the special data 104 is input at S105. As described above, what is required to input the transmission data 102 is to set any one of the sender name, the company name, the address, the telephone number, the fax number, and the e-mail address. Additionally, to input the special data 104, a user can freely set character strings, signs, etc.

At S106, an output mode is set for the transmission data 102 or the special data 104 that has been input at S105.

Then, an output location in an output mode is set at S107. At this time, a plurality of output locations may be set without being limited to one output location. For example, if a storage mode is set at S105, the storage unit 5 and the host computer 15 may be set as destinations to which the manuscript data 100 is transferred.

Then, at S108, it is determined whether an additional output mode is set for the transmission source data 102 or the special data 104 that has been input at S105. In other words, in one piece of transmission source data 102 or one piece of special data 104, it is determined whether a plurality of output modes are set.

If it is determined that the additional output mode is set (S108: Yes), the process returns to S106, and setting of the additional output mode is executed at S106 and S107.

In contrast, if it is determined that the additional output mode is not set (S108: No), it is determined at S109 whether an additional transmission source data 102 or an additional special data 104 is input for the destination data 101 that has been selected at S104.

If it is determined that the additional transmission source data 102 or the additional special data 104 is input (S109: Yes), the process returns to S105, and the additional input transmission source data 102 or the special data 104 is input at steps of from S105 to S108.

In contrast, if it is determined that the additional transmission source data 102 or the additional special data 104 is not input (S109: No), it is determined whether the destination data 101 is again input or selected at S110.

If it is determined that the destination data 101 is again input or selected (S110: Yes), the process returns to S102, and the destination data 101 is again selected, and the setting table 19 will be set at following steps.

In contrast, if it is determined that the destination data 101 is not again input or selected (S110: No), the setting process is completed.

(Operations)

Figure 6:
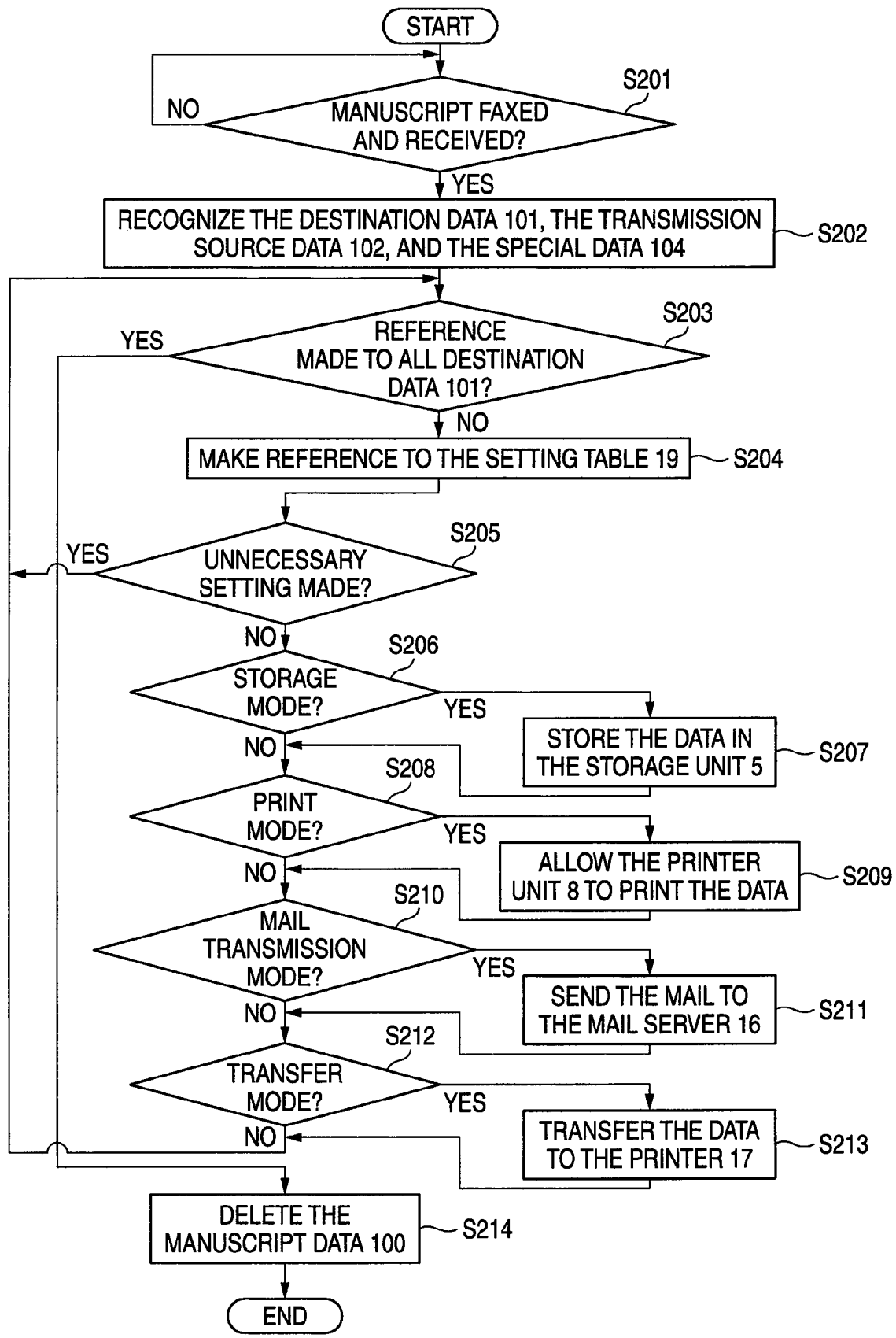
FIG. 6 is a flow chart showing an operation of the image forming apparatus when the image forming apparatus receives a facsimile.

Referring to FIG. 6, operations of the image forming apparatus 1 and operations of the facsimile receiving system 500 using the image forming apparatus 1 will be described.

It is assumed that the process of the invention is applied to the manuscript data 100. If it is determined that a manuscript has been faxed and received from the facsimile machine 14 at S201 (S201: Yes), specific information is extracted from the manuscript data 100 by the CPU 9 at S202, and the character recognition part of the scanner unit 7 respectively recognizes the destination data 101, the transmission source data 102 and the special data 104.

Then, it is determined whether reference has been made to the setting tables 19 of all pieces of destination data 101 at S203. If it is determined that reference has not been made to the setting tables 19 of all pieces of destination data 101 (S203: No), reference is made by the setting table 19 to the transmission source data 102, to the special data 104, and to the output mode based on one piece of recognized destination data 101 at S204.

Then, it is determined whether the manuscript data 100 is unnecessary at S205. The reason why a determination of whether the manuscript data 100 is unnecessary is required is to meet user's request to discard the manuscript data 100 including the corresponding transmission source data 102 and the corresponding special data 104. For example, S205 discards a junk facsimile including advertisement, sales promotion, service information or the like and being sent to a large indefinite number of destinations.

If it is determined that the manuscript data 100 is unnecessary (S205: Yes), the process returns to S203, and it is determined whether reference has been made to the setting tables 19 of all recipients.

If it is determined that the manuscript data 100 is not unnecessary at S205 (S205: No), an output operation is executed in each output mode at the following steps of from S206 to S213.

If the storage mode is set in the output mode, received data (i.e., the manuscript data 100) is stored in the storage unit 5 at S206 and S207.

If the print mode is set in the output mode, the manuscript data 100 is printed by the printer unit 8 at S208 and S209.

If the mail transmission mode is set in the output mode, a mail is sent to the mail server 16 through the network 13 at S210 and S211. The mail sent thereto, i.e., the contents of the manuscript data 100 can be confirmed by accessing the mail server 16 from the terminal device 18 and receiving the mail.

If the transfer mode is set in the output mode, the manuscript data 100 is transferred to the printer 17 through the network 13 at S212 and S213. The manuscript data 100 transferred thereto is printed by the printer 17.

The output operation is executed in this way, and then the process returns to S203, where it is again determined whether reference has been made to the setting tables 19 of all recipients.

If it is determined that reference has been made to the setting tables 19 of all recipients at S203 (S203: Yes), the manuscript data 100 becomes unnecessary, and hence is deleted at S214.

Modified Exemplary Embodiments

The whole structure of the facsimile receiving system 500 may not be limited to the above-described exemplary embodiments. For example, all terminals on the reception side may be connected together through the LAN 13A, or all terminals may be connected to the Internet 13B.

In the above-described exemplary embodiments, the setting table 19 is set for each destination data 101 while correlating the transmission source data 102 or the special data 104 with information necessary to execute the output mode. Alternatively, each destination data 101 may be set to be correlated with information necessary to execute the output mode.

For example, the manuscript data 100 may be output in an output mode determined for each destination data 101 even if the image forming apparatus 1 receives any type of manuscript data 100 having the transmission source data 102 or the special data 104.

In the above-described exemplary embodiments, the image forming apparatus 1 is described as an example of an image forming apparatus to which the invention is applied. However, the image forming apparatus of the invention is not limited to the image forming apparatus 1 described above. So long as the image forming apparatus has the facsimile function and the printer function, the inventive concept can be applied to a facsimile machine or an apparatus having the above-described functions.

Preferably, the apparatus, to which the invention is applied, may include various output modes, such as the storage mode, the mail transmission mode, and the transfer mode, in addition to the print mode.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. An image forming apparatus comprising:
a receiving unit configured to receive image data including a received image;
a setting table memory configured to store a relationship between specific information and a plurality of output modes, the specific information including transmission source information, special data and a recipient's name, and the plurality of output modes including a storage mode, a transfer mode, a mail transfer mode, a print mode and an unnecessary mode, wherein the recipient's name represents a name corresponding to the image forming apparatus;
an image forming unit configured to form an image on a recording medium;
a processor; and
memory storing instructions that, when executed by the processor, cause the image forming apparatus to perform operations comprising:
analyzing the received image and retrieving the specific information from the received image;
referring to the setting table memory and determining one of the output modes based on the transmission source information, the special data and the recipient's name, and
if the determined one of the output modes is the storage mode, referring to the setting table to determine a storage unit to store the received image and storing the received image in the storage unit;
if the determined one of the output modes is the transfer mode, referring to the setting table to determine a printer unit to print the received image and transferring the received image to the printer unit;
if the determined one of the output modes is the mail transfer mode, referring to the setting table to determine an email address to which the received image is to be transferred and transferring the received image to the email address;
if the determined one of the output modes is the print mode, causing the image forming unit to print the received image; and
if the determined one of the output modes is the unnecessary mode, discarding the received image.

2. The image forming apparatus according to claim 1, wherein the memory stores instructions that, when executed by the processor, cause the image forming apparatus to perform operations comprising:
recognizing importance information from the specific information; and
correlating the recipient's name with the importance information.

3. The image forming apparatus according to claim 2, wherein the importance information comprises at least one of the transmission source information and the special data.

4. The image forming apparatus according to claim 3, wherein the special data comprises confidential information.

5. The image forming apparatus according to claim 4, wherein the confidential information comprises a character string or a sign to keep secrecy or privacy of the image data.

6. The image forming apparatus according to claim 1, wherein the transmission source information includes a sender's name.

7. The image forming apparatus according to claim 1, wherein the specific information comprises multiple languages.

8. The image forming apparatus according to claim 1, wherein the retrieving includes recognizing the recipient's name and the transmission source information with character recognition.

9. A facsimile receiving system comprising:
a facsimile machine;
an image forming apparatus that is connected to the facsimile machine via a telephone line, the image forming apparatus comprising:
a receiving unit that receives image data sent including a received image from the facsimile machine via the telephone line;
a setting table memory configured to store a relationship between specific information and a plurality of output modes, the specific information including transmission source information, special data and a recipient's name, and the plurality of output modes including a storage mode, a transfer mode, a mail transfer mode, a print mode and an unnecessary mode, wherein the recipient's name represents a name corresponding to the image forming apparatus;
an image forming unit configured to form an image on a recording medium;
a processor; and
memory storing instructions that, when executed by the processor, cause the image forming apparatus to perform operations comprising:
analyzing the received image;
retrieving the specific information from the received image;
referring to the setting table memory and determining one of the output modes based on the transmission source information, the special data and the recipient's name, and
if the determined one of the output modes is the storage mode, referring to the setting table to determine a storage unit to store the received image and storing the received image in the storage unit;

if the determined one of the output modes is the transfer mode, referring to the setting table to determine a printer unit to print the received image and transferring the received image to the printer unit;

if the determined one of the output modes is the mail transfer mode, referring to the setting table to determine an email address to which the received image is to be transferred and transferring the received image to the email address;

if the determined one of the output modes is the print mode, causing the image forming unit to print the received image; and if the determined one of the output modes is the unnecessary mode, discarding the received image.

10. The facsimile receiving system according to claim 9, further comprising:
a computer that is connected to the image forming apparatus via a network; and
a printer that is connected to the image forming apparatus via the network,
wherein the memory stores instructions that, when executed by the processor, cause the image forming apparatus to further perform operations comprising:
recognizing importance information from the specific information; and
correlating the recipient's name with the importance information.

11. The facsimile receiving system according to claim 10, wherein the computer comprises a host computer, and wherein the storage unit is in the host computer.

12. The facsimile receiving system according to claim 9, wherein the transmission source information includes a sender's name.

13. The facsimile receiving system according to claim 10, wherein the computer comprises a mail server and a terminal device, and
wherein in the mail transfer mode a mail including contents of the received image is sent to the mail server in order to allow the terminal device to access the mail server to receive the mail.

14. The facsimile receiving system according to claim 9, wherein the retrieving includes recognizing the recipient's name and the transmission source information with character recognition.

15. An image forming apparatus comprising:
a receiving unit configured to receive image data including a received image;
a setting table memory including a plurality of setting tables one for each of a plurality of recipients' names, each setting table configured to store a relationship between specific information and a plurality of output modes, the specific information including transmission source information and special data, and the plurality of output modes including a storage mode, a transfer mode, a mail transfer mode, a print mode and an unnecessary mode, wherein the recipient's name represents a name corresponding to the image forming apparatus;
an image forming unit configured to form an image on a recording medium;
a processor; and
memory storing instructions that, when executed by the processor, cause the image forming apparatus to perform operations comprising:
analyzing the received image and retrieving the transmission source information, the special data and the recipient's name from the image data;
referring to the setting table memory and determining one of the output modes based on the transmission source information, the special data and the recipient's name, and
if the determined one of the output modes is the storage mode, referring to the setting table to determine a storage unit to store the received image and storing the received image in the storage unit;
if the determined one of the output modes is the transfer mode, referring to the setting table to determine a printer unit to print the received image and transferring the received image to the printer unit;
if the determined one of the output modes is the mail transfer mode, referring to the setting table to determine an email address to which the received image is to be transferred and transferring the received image to the email address;
if the determined one of the output modes is the storage mode, referring to the setting table to determine a storage unit to store the received image and storing the received image in the storage unit;
if the determined one of the output modes is the print mode, causing the image forming unit to print the received image; and
if the determined one of the output modes is the unnecessary mode, discarding the received image.

* * * * *